Patented Nov. 24, 1931

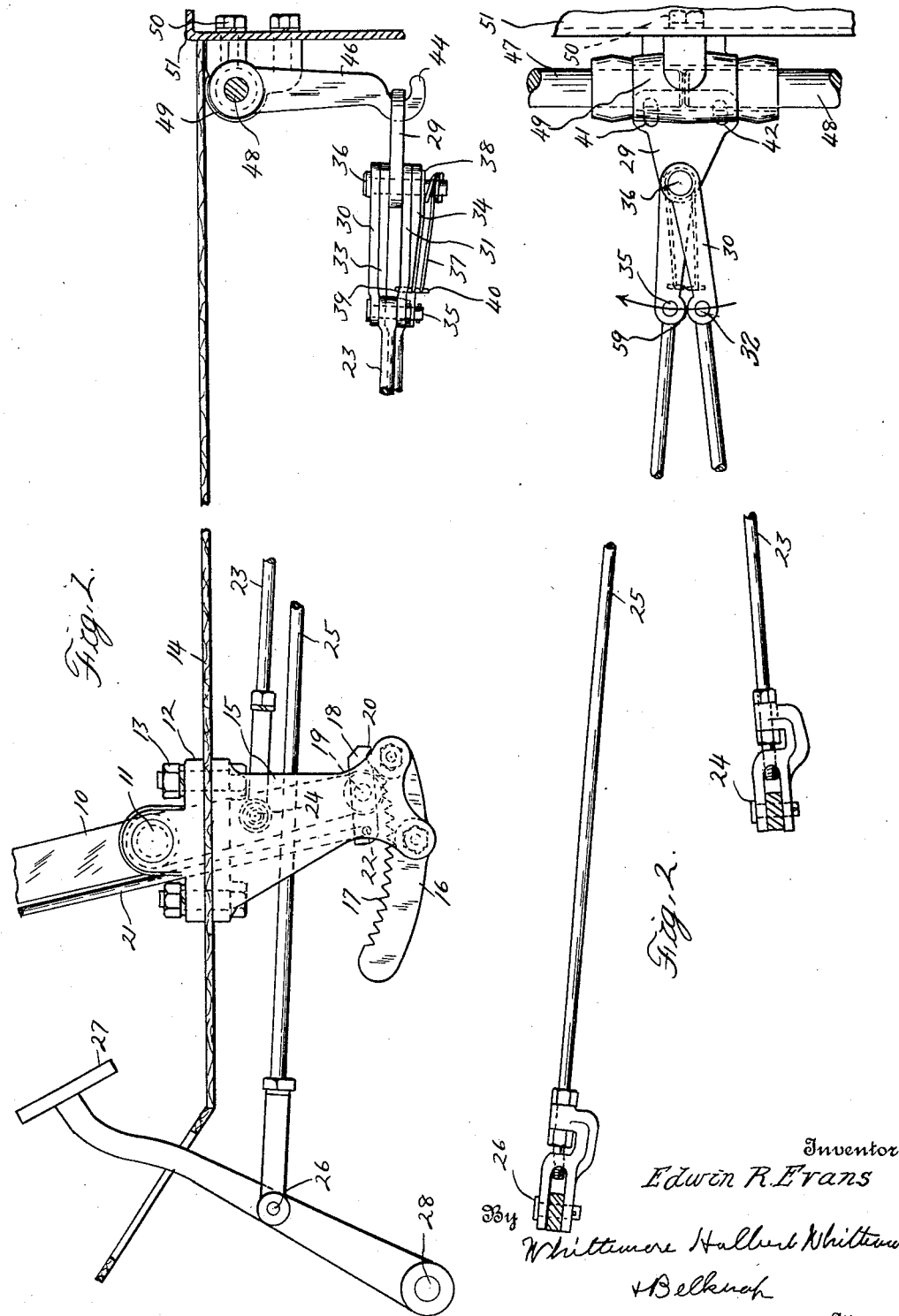

1,833,707

UNITED STATES PATENT OFFICE

EDWIN R. EVANS, OF DETROIT, MICHIGAN

BRAKE CONTROL

Application filed December 7, 1925. Serial No. 73,934.

The invention relates to brake control devices and refers more particularly to a brake for use with motor vehicles.

One of the objects of the invention is to provide a novel over-run device for use where a plurality of brake pull rods operate on the same pair of wheel brakes.

A further feature of the invention resides in the provision of equalizing means for equalizing the braking force applied to a pair of wheel brakes.

With these and other objects in view, the invention resides in the novel features of construction and combination and arrangements of parts as more fully hereinafter described and claimed.

Referring to the drawings in which like reference characters indicate corresponding parts, Figure 1 represents a side elevation view of the brake control device;

Figure 2 is a plan view of the same, the actuating levers for the brake control rods being omitted;

Figure 3:
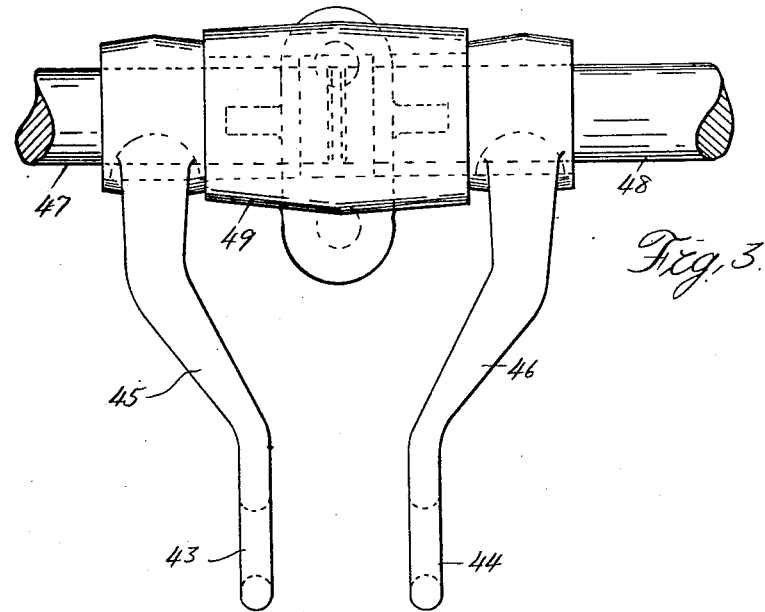
Figure 3 is a detail front elevation view of the cam shaft actuating levers.

In these views reference character 10 represents the emergency brake lever pivotally mounted at 11 to the pillow block 12, which latter is bolted at 13 to a suitable frame 14. The bolts 13 also serve to support the frame bracket 15 and bolted to this bracket at the lower end thereof is a ratchet plate 16 having the notches 17 formed on the upper face of the same. 18 is a ratchet pivotally carried at 19 with the lower end of the emergency brake lever 10, this ratchet having a tooth 20 engageable with the notches 17. 21 is a control rod pivotally connected at 22 with the ratchet 18 for controlling the pivotal movement of the ratchet, this control rod 21 being provided with the usual push button at the upper end of the rod 21 (not shown) permitting the operator to disengage the ratchet 18 from the notches 17 and thus release the brake. 23 represents an emergency or parking brake rod pivotally connected at 24 to the brake lever 10 so that when the operator pulls back on the lever 10 the brake rod 23 is pulled forwardly.

25 represents the service brake rod which in accordance with customary practice may be pivotally connected at 26 with the brake actuating pedal 27 adapted to rock about the point 28. 29 is an equalizer plate connected with the rod 23 through the links 30 and 31, these links being pivotally connected to the rear end of rod 23 by reason of the pin 32. Likewise the plate 29 is connected with the rod 25 through a pair of links 33 and 34, these links being pivotally connected with the rear end of rod 25 through a pin 35. 36 is a pivot pin which serves to pivotally connect the rear ends of the links 30, 31, 33 and 34 with the equalizer plate 29. The links 30 and 31 are held apart as much as the play will allow from the links 33 and 34 by reason of a spring 37 which has a portion 38 coiled about the pin 36 and the forward portions 39 and 40 respectively bent for engagement with the links 31 and 34.

Figure 4:
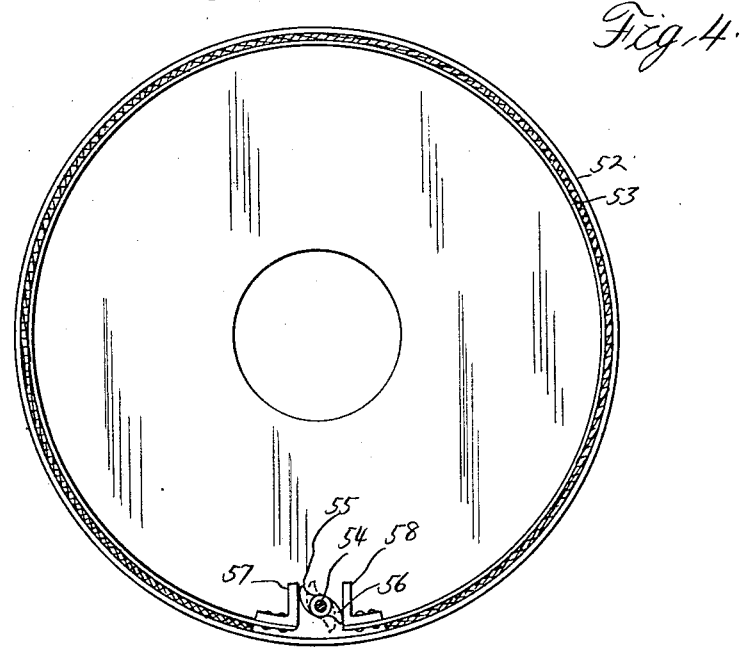
Figure 4 is a diagrammatic side elevation view of a braking device for use with the ground wheels of the motor vehicle.

The equalizer plate 29 is provided with the slotted portions 41 and 42 respectively engageable with the hooked portions 43 and 44 of the cam shaft actuating levers 45 and 46. These levers are respectively keyed to the cam shafts 47 and 48, which shafts have their ends independently rotatable in a bearing bracket 49 bolted at 50 with a suitable support 51. Each of the cam shafts 47 and 48 leads to a suitable braking device associated with the ground wheels of the motor vehicle and for purposes of illustration, I have shown in Figure 4, rather diagrammatically, one form of such a braking device. Referring to this figure, 52 is the brake drum and 53 the brake band adapted to be expanded into frictional contact with the drum for applying a braking force thereto. This brake band may be expanded through a rotative movement of the cam actuator 54, the cam actuator for this purpose being provided with cams 55 and 56 engageable with the adjacent ends 57 and 58 of the brake band 53. Thus, a cam actuator such as I have illustrated at 54, may be mounted to rotate with the cam shafts 47 and 48 respectively. In operation of the device when the brake rod 23 is pulled forwardly by the brake lever 10, the links 33 and 34 through action of spring 37 will travel in the direction of the arrow shown in full lines in Figure 2. Thus, the point 32 travelling forward will cause the rod 25 and links 33 and 34 to buckle, the pin 35 moving laterally away from the pin 32. Likewise, when the rod 25 is pulled forward leaving the rod 23 standing, the point 32 will travel in a direction opposite to that shown by the arrow, thus providing a simple and effective novel double over-run.

The plate 29 having its point of connection with the pin 36 between the slots 41 and 42 which engage the cam shaft actuating levers, it will be noted that a limited equalizing action will be afforded for the cam shafts 47 and 48 whenever either of the brake rods 23 or 25 is pulled forwardly to actuate the braking devices.

In the drawings the links 30 and 33 are shown touching at the point 59, but it will be understood that if there is any looseness in the rods 23 or 25 these links will stand apart due to the action of the spring load.

One of the features of my invention resides in the relation of the slots 41 and 42 with the pivotal point 36, the arrangement being such that should any part of the mechanism fail beyond either slot, as for example, between either of the shafts 47, 48 and the corresponding road wheel, the equalizing link 29 will move only slightly a sufficient distance to align the point 36 with the remaining effective slot, thus permitting application of a braking force to at least one of the road wheels. It will be noted that the link 29 thus acts as a limited equalizer, the loss of one branch of the mechanism for applying a braking force to one wheel not resulting in the loss of the other.

Furthermore, I preferably so position the pin 36 so that the service brake 25 which is the one used the most, normally evenly divides the force applied from rod 25 to the actuating levers 45 and 46. This is readily determined by normally locating the points 35 and 36 on a straight line connecting the pivot point 26 of rod 25 with a point midway between the slots 41 and 42.

While it is believed from the foregoing description, the nature and advantages of my invention will be readily understood, I desire to have it understood that I do not limit myself to what is herein shown and described and that such changes may be resorted to when desired as fall within the scope of the claims.

What I claim as my invention is:—

1. In combination with a pair of braking devices, a pair of brake applying rods, each of which is adapted to transmit a brake applying force to said braking devices, a member establishing a connection between each of said rods and the said pair of braking devices, means affording and over-run for one of the rods upon application of a braking force applied to the other of said rods, and means for urging said rods to a position permitting said over-run.

2. In combination with a pair of braking devices, a pair of brake applying elements, each of which is adapted to transmit a brake applying force to said braking devices, a member establishing a connection between each of said elements and the said pair of braking devices, and means affording an over-run for one of the elements upon application of a braking force applied to the other of said elements, said means including a spring tending to relatively move said rods.

3. In combination with a pair of braking devices, a pair of brake applying elements, each of which is adapted to transmit a brake applying force to said braking devices, a member establishing a connection between each of said elements and the said pair of braking devices, and means affording an over-run for one of the elements upon application of a braking force applied to the other of said elements, said means including a spring tending to separate said rods.

4. The combination with a pair of braking devices, of a pair of brake applying rods each of which is adapted to transmit a brake applying force to said braking devices, links pivotally connected at one end thereof to said rods respectively, a member pivotally connected to the other ends of said links, said member being adapted to transmit a braking force from the links to the said braking devices.

5. The combination with a pair of braking devices, of a pair of brake applying rods each of which is adapted to transmit a brake applying force to said braking devices, links pivotally connected at one end thereof to said rods respectively, a member pivotally connected to the other ends of said links, said member being adapted to transmit a braking force from the links to the said braking devices, one of said links being adapted to swing on its pivotal connection with the said member to move the rod connected thereto in a direction substantially transversely to the direction of movement of the rod upon application of a braking force applied to the other of said rods.

6. The combination with a pair of braking devices, of a pair of brake applying rods each of which is adapted to transmit a brake applying force to said braking devices, links pivotally connected at one end thereof to said rods respectively, a member pivotally connected to the other ends of said links, said member being adapted to transmit a braking force from the links to the said braking devices, one of said links being adapted to swing on its pivotal connection with the said member to move the rod connected thereto in a direction substantially transversely to the direction of movement of the rod upon application of a braking force applied to the other of said rods, and means acting on said links tending to separate said rods.

7. The combination with a pair of braking devices, of a pair of brake applying rods each of which is adapted to transmit a brake applying force to said braking devices, links pivotally connected at one end thereof to said rods respectively, a member pivotally connected to the other ends of said links, said member being adapted to transmit a braking force from the links to the said braking devices, one of said links being adapted to swing on its pivotal connection with the said member to move the rod connected thereto in a direction substantially transversely to the direction of movement of the rod upon application of a braking force applied to the other of said rods, said member being adapted to transmit an equalized braking force from each of said rods to the said braking devices.

8. The combination with a pair of braking devices, of a pair of brake applying rods each of which is adapted to transmit a brake applying force to said braking devices, links pivotally connected at one end thereof to said rods respectively, a member pivotally connected to the other ends of said links, said member being adapted to transmit a braking force from the links to the said braking devices, one of said links being adapted to swing on its pivotal connection with the said member to move the rod connected thereto in a direction substantially transversely to the direction of movement of the rod upon application of a braking force applied to the other of said rods, and means acting on said links tending to separate said rods, said members being adapted to transmit an equalized braking force from each of said rods to the said braking devices.

9. The combination with a pair of braking devices, of a pair of actuating members respectively connected to actuate the said braking devices, an equalizer link pivotally connected at spaced points with said actuating members respectively, a pair of brake applying means pivotally connected at a common third point with said equalizer link, one of said brake applying means being so located as to normally evenly divide the force therefrom through the equalizer link to the said actuating members.

10. The combination with a pair of braking devices, of a pair of actuating members respectively connected to actuate the said braking devices, an equalizer link pivotally connected at spaced points with said actuating members respectively, a pair of brake applying means pivotally connected at a common third point with said equalizer link, said brake applying means extending at an angle to each other, one of said means being located so as to normally evenly divide the force therefrom through the equalizer link to the said actuating members.

11. The combination with a pair of braking devices, of a pair of actuating members connected to actuate said braking devices, an equalizer link connected at spaced points with said actuating members respectively, a service brake rod and an emergency brake rod, said rods being adapted to transmit a brake applying force at a common third point to said equalizer link, said service brake rod being so located as to normally evenly divide the force therefrom through the equalizer link to the said actuating members.

12. The combination with a pair of braking devices, of a pair of actuating members connected to actuate said braking devices, an equalizer link connected at spaced points with said actuating members respectively, a service brake rod and an emergency brake rod, said rods, extending at an angle with each other and being adapted to transmit a brake applying force at a common third point to said equalizer link, said service brake rod being so located as to normally evenly divide the force therefrom through the equalizer link to the said actuating members.

13. The combination with a pair of braking devices, of a pair of actuating members connected to actuate said braking devices, an equalizer connected with said actuating members respectively, a service brake rod and an emergency brake rod, said rods being adapted to transmit a brake applying force to said equalizer, said service brake rod being so located as to normally evenly divide the force therefrom through the equalizer to the said actuating members.

14. The combination with a pair of braking devices, of a pair of brake applying rods, each of which is adapted to transmit a brake applying force to said braking devices, links pivotally connected at one end thereof to said rods respectively, a member pivotally connected to the other ends of said links, said member being adapted to transmit a braking force from the links to the said braking devices, one of said brake applying rods being so located as to normally evenly divide the force therefrom through said member to the said braking devices.

15. The combination with a pair of braking devices, of a pair of actuating members respectively connected to actuate the said braking devices, an equalizer link pivotally connected at spaced points with said actuating members respectively, a service brake rod and an emergency brake rod, each being adapted to transmit a brake applying force to said braking devices, links pivotally connected at one end thereof to said rods respectively, the other ends of said links being pivotally connected at a common point to said equalizer link, said link equalizing the forces transmitted from the said rods to the said actuating members to a limited extent whereby in the event of failure of one of said braking devices, the other may be operated through said link.

16. In combination with a pair of braking devices, a pair of brake applying elements, each of which is adapted to transmit a brake applying force to said braking devices, and pivoted means associated with each brake applying element permitting buckling of one element upon the application of a braking force through the other element.

17. The combination with a pair of braking devices, of a pair of brake applying members, each of which is adapted to transmit a brake applying force to said braking devices, each of the said members comprising a plurality of pivoted sections, and means tending to cause pivotal movement between the sections of each member to permit an over-run of one member upon the application of a braking force through the other member.

18. The combination with a pair of braking devices, of a pair of brake applying elements, each of which is adapted to transmit a brake applying force to said braking devices, and a member establishing a connection between each of said elements and the said pair of braking devices, each of the said elements being pivoted intermediate its length to permit an over-run of one element upon the application of a braking force through the other element.

19. In combination with a pair of brake devices, a pair of brake applying elements, each of which is adapted to transmit a brake applying force to said braking devices, a member establishing connection between said devices and elements, and an articulated connection associated with each of said brake applying elements affording an over-run for one of the elements upon the application of a braking force through the other element.

20. In combination with a pair of braking devices, a pair of brake applying elements, each of which is adapted to transmit a brake applying force to said braking devices, a member establishing connection between each of said elements and the said pair of braking devices, and an articulated connection associated with each of said brake applying elements affording an over-run for one of the elements upon the application of a braking force through the other element, said member being adapted to transmit an equalized braking force from each of said elements to the said braking devices.

21. In combination with a braking device, a pair of brake applying elements, each of which is adapted to transmit a brake applying force to said braking device, and pivoted means forming a part of at least one brake applying element permitting buckling of one element upon the application of a braking force through the other element.

22. In combination with a vehicle, brakes on opposite sides of the vehicle, an oscillating brake actuating structure extending across the vehicle frame and having its ends associated with the wheel brakes, means acting as a bearing intermediate the ends of the structure, a pair of brake applying elements, each of which is adapted to transmit a brake applying force to said brake actuating structure, and pivoted means forming a part of at least one brake applying element permitting buckling of one element upon the application of a braking force through the other element.

23. In combination with a vehicle, brakes on opposite sides of the vehicle, an oscillating brake actuating structure extending across the vehicle frame and having its ends associated with the wheel brakes, means acting as a bearing carried by the vehicle frame intermediate the ends of the structure, a pair of brake applying elements, each of which is adapted to transmit a brake applying force to said brake actuating structure, said elements being connected to the structure on opposite sides of the bearing, and pivoted means forming a part of at least one brake applying element permitting buckling of one applying element upon the application of a braking force through the other element.

24. In combination with a vehicle, brakes on opposite sides of the vehicle, an oscillating brake actuating structure having its ends associated with the wheel brakes, means acting as a bearing carried by the vehicle frame intermediate the ends of the structure, a pair of brake applying elements, each of which is adapted to transmit a brake applying force to said brake actuating structure and each of which is connected to the structure on opposite sides of and adjacent the bearing, and pivoted means forming a part of at least one brake applying element permitting buckling of one element upon the application of a braking force through the other element.

In testimony whereof I affix my signature.

EDWIN R. EVANS.